United States Patent
Armbruster

(10) Patent No.: US 9,718,227 B2
(45) Date of Patent: Aug. 1, 2017

(54) DEVICE AND METHOD FOR PRODUCING INJECTION-MOLDED PARTS WHICH COMPRISE DIFFERENT COMPONENTS

(75) Inventor: Rainer Armbruster, Wolfach (DE)

(73) Assignee: FOBOHA GmbH, Haslach (DE)

( * ) Notice: Subject to any disclaimer, the term of this patent is extended or adjusted under 35 U.S.C. 154(b) by 597 days.

(21) Appl. No.: 14/128,345

(22) PCT Filed: Jun. 15, 2012

(86) PCT No.: PCT/EP2012/061426
§ 371 (c)(1),
(2), (4) Date: Dec. 20, 2013

(87) PCT Pub. No.: WO2013/000734
PCT Pub. Date: Jan. 3, 2013

(65) Prior Publication Data
US 2014/0134366 A1 May 15, 2014

(30) Foreign Application Priority Data
Jun. 30, 2011 (CH) .................................. 1097/11

(51) Int. Cl.
*B29C 45/04* (2006.01)
*B29C 45/14* (2006.01)
(Continued)

(52) U.S. Cl.
CPC ........ *B29C 45/1418* (2013.01); *B29C 45/006* (2013.01); *B29C 45/045* (2013.01);
(Continued)

(58) Field of Classification Search
CPC ............ B29C 45/1418; B29C 45/1628; B29C 45/066; B29C 45/045; B29C 45/006
See application file for complete search history.

(56) References Cited

U.S. PATENT DOCUMENTS 3,807,920 A * 4/1974 Aoki .................. B29C 45/1615
264/245
4,444,711 A * 4/1984 Schad .................. B29C 45/045
264/243
(Continued)

FOREIGN PATENT DOCUMENTS

DE  10 2006 016 200 A1  10/2007
EP   1 155 802 A2  11/2001
(Continued)

OTHER PUBLICATIONS

Partial machine translation of WO2004/103676A2 dated Dec. 2, 2004 obtained from the espace website.*
(Continued)

*Primary Examiner* — Robert B Davis
(74) *Attorney, Agent, or Firm* — Pauley Erickson & Kottis

(57) ABSTRACT

The invention relates to a device and a method for producing plastic moldings from at least two different sub-elements (15; 16) that includes first and second mold halves (3) and a rotatable center block (6) with center and third mold halves (8; 17) interposed therebetween. The center and third mold halves define first and second parting planes with the first and second mold halves. First cavities are defined in the first parting plane, into which a first plastic component is introduced to produce preforms (12). When the first parting plane is opened, the performs (12) remain on the center mold halves (8) and are brought into the second parting plane when the center block (6) is rotated, in which second parting plane second cavities are at least partially defined by the preforms (12), into which a second plastic component is introduced and first sub-elements (15) are produced. Second sub-elements (16) are produced in the additional cavities. When the second parting plane is opened, the sub-elements
(Continued)

(15; 16) remain on the center and third mold halves (8) and are rotated into a lateral assembly position when the center block (6) is rotated.

8 Claims, 1 Drawing Sheet

(51) Int. Cl.
    *B29C 45/16*     (2006.01)
    *B29C 45/00*     (2006.01)
    *B29L 31/56*     (2006.01)

(52) U.S. Cl.
    CPC ..... *B29C 45/1628* (2013.01); *B29L 2031/565* (2013.01); *Y10T 428/1352* (2015.01)

(56) References Cited

U.S. PATENT DOCUMENTS

| | | |
|---|---|---|
| 5,518,387 A | 5/1996 | Di Simone |
| 6,464,921 B1 * | 10/2002 | Armbruster ............. B29C 45/16 264/250 |
| 6,558,149 B1 | 5/2003 | Bodmer et al. |
| 7,150,845 B1 * | 12/2006 | Gram .................... B29C 45/045 264/254 |
| 8,414,813 B2 | 4/2013 | Jung et al. |

FOREIGN PATENT DOCUMENTS

| | | | |
|---|---|---|---|
| IL | WO 2010140153 A1 * | 12/2010 | ......... B29C 45/0053 |
| WO | WO 2004/103676 A2 | 12/2004 | |
| WO | WO 2009/080827 A2 | 7/2009 | |

OTHER PUBLICATIONS

G. Menges et al., "Spritzgiesswerkzeuge", Chapter 13, http//files.hanser.de/hanser/docs/20070928_2792813211-106_978-3-446-40601-8_Leseprobe.pdf.

* cited by examiner

DEVICE AND METHOD FOR PRODUCING INJECTION-MOLDED PARTS WHICH COMPRISE DIFFERENT COMPONENTS

BACKGROUND OF THE INVENTION

Field of the Invention

The present invention relates to a method and a device for injection-molding and assembling plastic parts comprising a plurality of plastic components, in particular an injection-molding device with a rotatable cube tool as claimed in the pre-characterizing clause of the independent claims.

Discussion of Related Art

Injection-molding devices for injection molding with one or more rotating center mold parts, usually in the form of a cube, are known from the prior art. These are used, for example, for the efficient production of multi-component plastic parts.

An injection-molding machine with two parting planes and a turning system which is arranged between a fixed and a moving mold mounting plate and has a center rotating block with cavity halves on the side surfaces is presented in EP1155802. The center rotating block is retained between the mold mounting plates by a lower and an upper holding device and can be rotated about a vertical axis. The holding devices are guided on tie bars of the injection-molding machine. In order to compensate for the weight of the center mold part, the lower holding device can be supported on the machine bed of the injection-molding machine. A plastic component is injected into cavities between cavity halves on the mold mounting plates and the rotating block by means of injection stations, thus producing injection-molded parts. After injection, the injection-molded parts can remain on the rotating block and turned into a 90° rotated position for cooling and ejection.

An injection-molding device having a processing device arranged laterally on a rotating block, which processing device is intended for the processing or manipulation of parts or intermediate products which have been produced in a first or second parting plane and adhere to the rotating block, is disclosed in WO 2009/080827. The processing device can be mounted on a cross bar or holding frame of the injection-molding device and moves with the rotating block when it is traversed. Further, the processing device can be arranged on the holding frame so that it can move in at least one direction, enabling it to be positioned opposite the rotating block. The processing device can be provided by a capping device, for example, or further parts can be fed in and applied to the injection-molded parts by means of the processing device. This injection-molding device is not intended for the production of plastic parts comprising a plurality of different plastic components.

The production of injection-molded parts from a plurality of sub-elements in an injection-molding device with cube technology is likewise presented in WO2004/103676. In a first process area, two sub-elements are produced in cavities which are formed between outer first mold halves and second mold halves on a rotating cube. The cube with the sub-elements is then rotated into a second process area in which the sub-elements are joined by means of a manipulating device. By rotating further, the joined sub-elements come to rest in a third process area, in which they are joined to a third sub-element in a third cavity, the wall of the third cavity being formed in some areas by the first or second sub-element. By rotating further, the joined sub-elements move into a fourth process area, in which they are removed from the injection-molding device. When producing plastic parts with such an injection-molding device, additional processing units, which are necessary for handling the injection-molded parts during production, are required on both sides of the device.

DE 102006016200 describes a method for the production of multi-component plastic molded parts, wherein cavities, into which molten plastics are injected, are formed by means of two external mold mounting plates with external cavity halves and a center rotatable mold carrier element with at least four cavity halves in two parting planes. Here, in a first step, preforms of different components are produced in first cavities in the two parting planes. The mold carrier element is then rotated and new cavities are formed with other cavity halves of the mold carrier element, wherein the preforms remain in the external cavity halves of the external mold mounting plates. In a second step, the preforms are coated with a PUR skin. A robot system, which comprises gripper and pre-treatment units, by means of which separating agents, for example, are applied to the surfaces of mold halves or the finished components can be removed, is arranged next to the injection-molding device. Here, the different components are finished on different sides of the rotatable mold carrier element, which makes removal and further processing of the components more difficult. Further, grippers, which intervene between the cavity halves, must be provided on both sides of the injection-molding device in order to remove the components.

The same applies to a device for removing workpieces from an injection-molding device according to U.S. Pat. No. 5,518,387. This is based on swinging arms, which, when the injection-molding device is open, can be swung into the parting plane from the side about an axis of rotation arranged parallel to the parting plane.

SUMMARY OF THE INVENTION

An object of the invention consists in presenting an improved injection-molding device for the injection-molding and assembly of plastic parts comprising a plurality of plastic components, which enables production to be carried out easily and quickly and simplifies a precise positioning of plastic parts.

Further, it is an object of the invention to provide a method for the production of plastic parts comprising a plurality of plastic components, which facilitates a flexible and rapid production process and guarantees production with small tolerances. This object is achieved by the injection-molding device defined in the independent patent claims and a corresponding method. Advantageous embodiments and various alternatives can be seen from the dependent claims.

An injection-molding device according to the present invention is used particularly for the production of plastic parts which are made up of a plurality of sub-elements and with which at least one of the sub-elements comprises a plurality of for example, distinct plastic materials or colors. The injection-molding device has first cavity halves and second cavity halves which, together with further cavity halves on a center block, can in each case form cavities for the sub-elements. The cavity halves are provided on mold mounting plates, which, if required, are arranged releasably within the injection-molding device. The second cavity halves can be slid in a first direction with respect to the first cavity halves along a longitudinal axis of the injection-molding device. The center block is arranged between the first and the second cavity halves and is provided so that it can be rotated about an axis as well as slid in the first direction. On at least one side surface, the center block has center cavity halves, which, together with the first and the second cavity halves, form cavities in a first and a second parting plane or a first and a second closing position. The first and second cavity halves or the mold mounting plates and the center block can be arranged, for example on tie bars of the injection-molding device, and can be moved, for example by means of a coordination device, relative to one another in and opposing the first direction in the longitudinal direction in order to open and close the parting planes.

Together with the center cavity halves, the first cavity halves form cavities for receiving a first plastic component and for molding preforms for a first sub-element. Together with the preforms in the center cavity halves, the second cavity halves at least partially form second cavities for receiving a second plastic component and for molding the first sub-elements when the center cavity halves with the first plastic component have been rotated into a position, the second closing position, opposite the second cavity halves. Preferably, in the second parting plane, a second plastic component which is distinct from the first plastic component is introduced into the second cavities.

Third cavity halves, which are arranged next to the first and/or the second cavity halves on the first or second mold mounting plate, are arranged on the center block. The third cavity halves on the center block and the fourth cavity halves form additional cavities for second sub-elements. These second sub-elements remain in the third mold halves when the center block is rotated from the first injection position or the second injection position into the assembly position; likewise, the first sub-elements remain in the center cavity halves.

A working device is arranged at the side of the center block, i.e. the working device is provided next to the center block in such a way that it lies at least partially on an axis perpendicular to the longitudinal axis of the first direction of movement of the mold halves or next to this longitude axis. The working device is therefore provided next to the tie bars of the injection-molding device for example. At the same time, the working device can also be provided on the tie bars or on holding elements which are arranged on the tie bars. When the center and third cavity halves with the first and second sub-elements have been rotated into a lateral assembly position opposite the working device, second sub-elements can be fitted to the first sub-elements for the purpose of producing plastic parts by means of the working device.

With the method according to the invention for producing plastic parts from at least two different sub-elements with such an injection-molding device, the preforms are produced in the first parting plane in a first closing position in the cavities between the first cavity halves and the center cavity halves and remain on the center block or on the center mold halves after the cavity halves of the first parting plane have been opened. The center block is then brought directly or indirectly into a position opposite the second cavity halves, that is to say into the second parting plane and into the second closing position, by means of a suitable rotating device. For this purpose, the center block is rotated about 180° in one or more steps in a first direction of rotation from its starting position (first injection position or closing position), in which the center cavity halves lie opposite the first cavity halves, so that the center block is situated in a second injection position or closing position. In the second closing position, together with the preforms located in the center cavity halves, the second cavity halves at least partially form second cavities, and a second plastic component, which is attached to the preforms, is injected into the second cavities, so that first sub-elements are produced. The second plastic component adheres to the first plastic component and both components together form the first sub-element of the plastic parts. When the second parting planes are opened, the first sub-elements remain on the center block or on the center mold halves, and are rotated into a lateral position by further rotation of the center block, preferably in the first direction of rotation as in the rotation of the center block out of the first injection position into the second injection position. That is to say, the center block is rotated through 270° relative to the starting position in which the first cavities were formed and is then situated in the lateral position in which the center cavity halves lie opposite the working device. This position corresponds to an assembly position. The side surface of the center block, on which the finished first sub-element is held, therefore faces outwards at right angles to the direction of movement of the cavity halves and in the direction of the working device.

The preforms can fully border the second cavities on sides of the center block so that the second cavity halves completely seal against the moving mold mounting plate. Or, areas of the center cavity halves can likewise contribute to forming the cavities, so that the cavities on the second parting plane are formed by the preforms, areas of the center cavity halves and the second cavity halves.

The second sub-elements are produced in the additional cavities between the center block and the first or second mold mounting plate in the first or second closing position. For this purpose, the third cavity halves on the center block together with the fourth cavity halves on the first or second mold mounting plate form the additional cavities. Preferably, the second sub-elements in the first closing position are made from the same material as the preforms, and in the second closing position from the second material which is applied to the preforms. The working device assembles the first and the second sub-elements to produce the plastic parts and releases the plastic parts from the mold halves on the center block.

The individual working steps for injection-molding preforms and sub-elements can initially be completed with an injection-molding device and method according to the present invention. By this means, the production of all sub-elements can be carried out without being interrupted by further working steps or additional effort for controlling such working steps being necessary. The different sub-elements can be assembled to the side of the direction of movement of the cavity halves of the injection-molding device after all parts have been produced. It is not necessary to provide different working machines for the intermediate processing of blanks on different sides of the center block or of the injection-molding device. This simplifies and accelerates the production process sequence. Further, when producing the sub-elements, the tolerances between the sub-elements and in the assembly of the sub-elements can be reduced, thus enabling plastic parts of high precision to be produced. If necessary, assembly can also be carried out externally after orderly removal.

In an embodiment, the first and fourth cavity halves can be formed on a first mold mounting plate and, for example, be provided thereon in regular rows arranged offset diagonally with respect to one another. The different cavity halves can be distributed along rectangular, in particular square, grids on the mounting plates, wherein the cavity halves for first and second sub-elements alternate along a row or diagonal of the grid. The center and the third cavity halves on the side surface of the center block are arranged in a complementary manner to the first or second and fourth cavity halves. In order to retain the first and second sub-elements, the center and third cavity halves have a shaped fit or a retainer, for example, to hold the sub-elements, which are suitable for opening the parting planes in such a way that the sub-elements are retained in this shaped fit. The first and second sub-elements are releasably accommodated in their respective shaped fit.

As a result of the distribution of the center and third cavity halves described above, the first sub-elements are arranged adjacent to second sub-elements with a predefined regular spacing in each case. Two associated sub-elements for forming a plastic part are accordingly arranged alternately with respect to one another at regular intervals.

In addition to the cavity halves for the first and second sub-elements of the plastic parts, further cavity halves can be provided in order to produce further sub-elements of the plastic parts if a plastic part with more than two sub-elements is to be produced. It is important here that all sub-elements remain on the same side surface of the center block until the side surface is located opposite the working device and is therefore in the assembly position.

The working device can be movably retained on the injection-molding device or, for example, arranged movably on a machine bed for the injection-molding device. The working device has a gripper unit, for example, with a multiplicity of gripper elements, which are provided on a working surface and are arranged corresponding to the arrangement of the center and third cavity halves. The gripper elements are accordingly distributed on the working surface, for example corresponding to the grid of the cavity halves on the center block. The gripper elements can be provided, for example, by means of simple openings or depressions in the working surface, the shape of which is matched to the shape of the sub-elements in such a way that the sub-elements are retained in the openings or depressions by friction. By means of the gripper elements, the working device can remove the first or the second sub-elements from the center block and assemble them on the second or first sub-elements respectively. For example, the first sub-elements can be clipped onto the second sub-elements. For this purpose, the working device can be moved relative to the center block along the grid in which the cavity halves for the first and second sub-elements are arranged. In doing so, only the predefined distance between first and second sub-element has to be overcome.

With an embodiment of the injection-molding device in which all sub-elements of the plastic parts to be produced are produced by cavity halves which are located on the same side surface of the center block, and first sub-elements are removed from their cavity halves and mounted directly onto adjacent second sub-elements, a precise production of the plastic parts can be guaranteed. The tolerance deviations when positioning the sub-elements with respect to one another can be improved. On the one hand, this is possible, as different sub-elements are produced on the same side surface of the center block and are associated with one another in pairs. On the other, the whole injection-molding process for producing the first and second sub-elements takes place substantially without being interrupted by further processing steps of the sub-elements and can therefore be completed as quickly as possible. The different parts can be gripped and assembled on the same side.

Basically, however, it is also conceivable to stop the center block after a 90° turn from the starting position. The preforms can be cooled, e.g. by means of a cooling device, in this intermediate position. The center block is then rotated through a further 90° into the second injection position.

An injection-molding device and a method described above are especially advantageous for producing at least partially hollow plastic parts or sub-elements, in particular plastic lids. A precise alignment of the sub-elements is necessary when at least partially hollow sub-elements are joined to form a plastic part. In the case of plastic lids, small tolerances must be maintained in order to guarantee the sealing of the lid. According to the invention, this is possible due to the predefined association of the cavity halves for producing two sub-elements which together form a plastic part, and due to a rapid completion of the injection-molding process for the sub-elements as described above.

A device according to the invention is, for example, particularly suitable for the production of caps for beverage packages. For example, a multipart bottom part with a cap can be easily produced cost effectively and with very high accuracy in one and the same device. Highly complex and therefore expensive external assembly devices can be dispensed with. If required, quality control means can also be incorporated into the device. For example, the first parts can be visually inspected at 90°. A further advantage is that caps can be tested for leaks at 270° or shortly thereafter, e.g. by applying a pressure difference, before being removed. In a further embodiment, the device has more than one center mold halves, to which partly manufactured parts can be transferred or which are used for the preassembly of parts.

BRIEF DESCRIPTION OF THE DRAWINGS

Preferred embodiments of the invention are shown below based on the drawings, which serve merely to provide an explanation and are not to be construed in a restrictive manner. Features of the invention which become apparent from the drawings are to be considered individually and in every combination as being part of the disclosure of the invention. In the drawings.

DETAILED DESCRIPTION OF THE INVENTION

Figure 1:
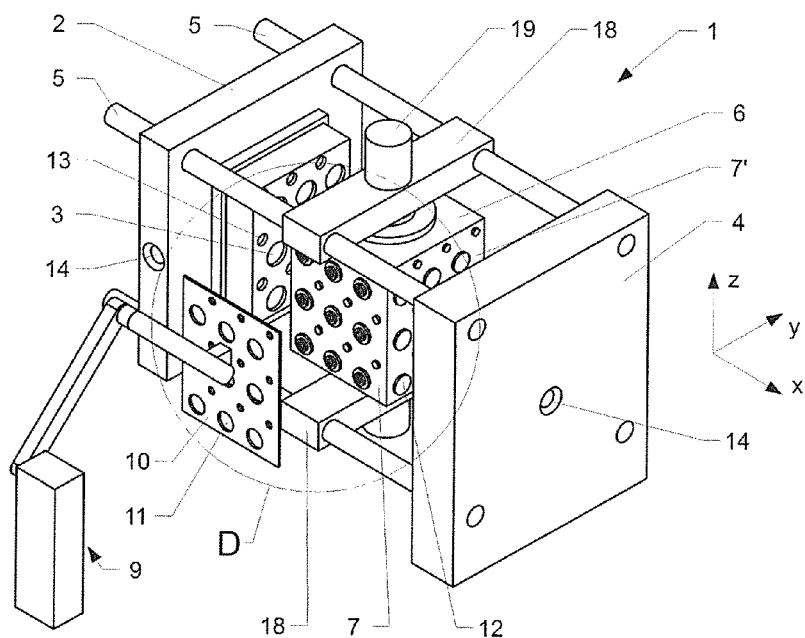
FIG. 1 shows a three dimensional schematic diagram of an injection-molded device according to the present invention.

An injection-molded device 1, which has a first mold mounting plate 2 with first cavity halves 3 and a second mold mounting plate 4 with second cavity halves lying opposite thereto, is shown in FIG. 1. The mold mounting plates 2 and 4 are connected to one another by tie bars 5 in such a way that the second mold mounting plate 4 can be slid relative to the first mold mounting plate 2 in a first direction along the longitudinal axis of the injection-molding device; in the direction x according to FIG. 1. A center block 6, which can be rotated about an axis z and can be slid in the first direction, is provided between the first and the second mold mounting plate. The center block has four side surfaces 7, wherein center cavity halves 8 and third cavity halves 17 are attached to one side surface. The center block 6 is rotatably held on the upper and lower tie bars 5 by means of an upper and a lower holding device 18. A rotating device 19 is provided on the upper holding device 18 in order to rotate the center block. Here, the axis of rotation runs perpendicular to the first direction of movement of the mold mounting plates; in direction z according to FIG. 1. A conventional coordination device can be used to match the movements of first mold mounting plate 2, center block 6 and second mold mounting plate 4 relative to one another.

A working device 9, which can be designed as a multi-section robot arm for example, is provided to the side of the center block 6. The working device is arranged outside the injection-molding area spanned by the tie bars 5, that is to say provided offset in a direction y with respect to the direction of movement of the mold mounting plates. It lies substantially opposite the center block in an open position of the mold mounting plates 2 and 4. At its end facing the injection-molding device 1, the working device has a working surface 10, on which a gripper unit with a plurality of gripper elements 11 is provided.

In a first parting plane, together with the center cavity halves 8, the first cavity halves 3 form first cavities into which a first plastic component is injected and in which preforms 12 are produced, as shown schematically in the figures on a further side surface 7' of the center block. Further, third cavity halves 15 are provided on the center block 3 and fourth cavity halves 13 on the mold mounting plate 2, which together form cavities for second sub-elements. In a second parting plane, the preforms 12 together with the second cavity halves on the mold mounting plate 4 form second cavities. In doing so, the preforms seal the second cavity halves.

Openings 14 for connecting injection-molding devices which introduce the plastic components into the cavities are in each case provided on the first and second mold mounting plate 2 and 4. A first plastic component is introduced into the first cavities on the first mold mounting plate 2 and a second plastic component into the second cavities on the second mold mounting plate 4, wherein the second component is bonded to the first component so that first sub-elements are produced.

Figure 2:
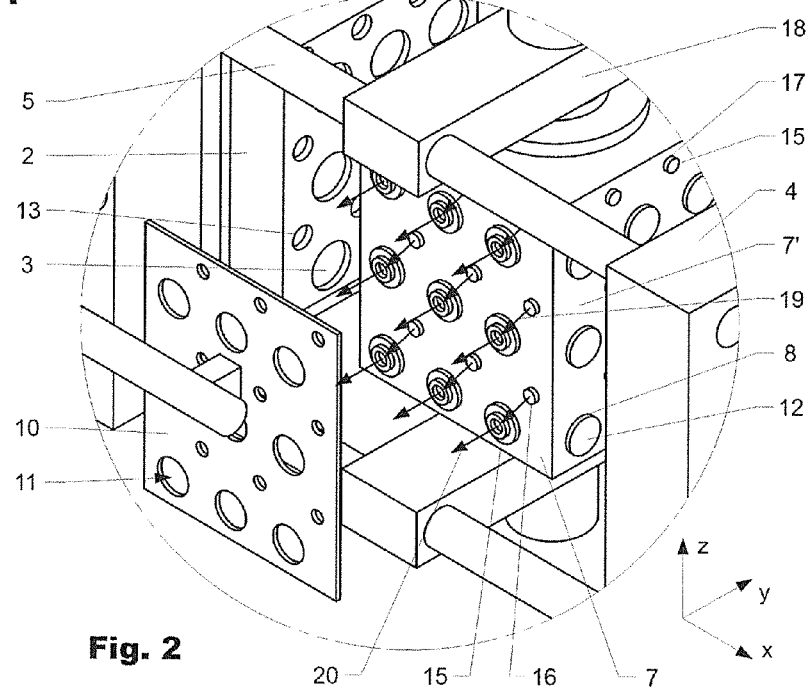
FIG. 2 shows a three dimensional detail view D from FIG. 1.

A section of FIG. 1 designated by D is shown enlarged in FIG. 2. From this, the distribution of the center and third cavity halves 8 and 17 on the side surface 7 of the center block 6 can be seen. The center cavity halves 8 are arranged at equal intervals in rows according to a rectangular grid. Offset therefrom by a defined distance, the third cavity halves 17 are likewise arranged at equal intervals in rows in a rectangular grid, so that the center and third cavity halves are provided alternately with respect to one another at regular intervals. A third mold half 17 is associated with every center mold half 8. Basically, the cavity halves can also be distributed on the side surface 7 in geometries other than a rectangular geometry, e.g. in a rhombuslike grid. The gripper elements 11 on the working device 9 are arranged in the same geometry.

In a starting position, i.e. in the first injection-molding position, of the center block, the preforms 12 and the second sub-elements 15 are produced from the first component in the first parting plane. The injection-molding device is opened, wherein the preforms 12 and the second sub-elements 15 remain in the middle and third cavity halves of the center block. The center block 6 is rotated in two steps by 180° into the second injection position, in which the side surface 7 lies opposite the second mold mounting plate 4. In FIG. 2, by way of example, preforms 12 and second sub-elements 15 are shown on the center block on the side surface 7' opposite the mold mounting plate 4. The injection-molding device 1 is closed, thus forming the second cavities. A second plastic component is then injected into these so that the second sub-elements 16 can be finished. This completes the injection-molding process for the production of plastic components.

When the injection-molding device 1 is opened in the second parting plane, the first and second sub-elements 15 and 16 remain in the center and third cavity halves on the center block 6. The center block is then rotated by a further 90° in the direction of rotation so that the side surface 7 is arranged at the side of the injection-molding device and lies opposite the working device. This position corresponds to an assembly position. As can be seen in FIG. 2, the first and second sub-elements 15 and 16 are distributed in pairs at regular intervals on the side surface 7 of the center block 6. A second sub-element 16 is associated with each first sub-element 15.

The gripper elements 11 of the working device 9 can now grip the second sub-elements 16 and place them on the first sub-elements 15. This process is shown schematically by first arrows 19. In doing so, the working surface 10 is traversed along the side surface 10 of the center block 6 by the distance which encompasses the two mutually associated sub-elements. As soon as the first and the second sub-elements are bonded and therefore the plastic components to be produced are complete, these can be removed from the center block by means of the working device. This process is shown schematically by second arrows 20.

The situation on one side surface of the center block is shown in the figures in the interests of better clarity. However, it is advantageous to provide mold mounting plates with center and third cavity halves on all four side surfaces of the center block in order to produce plastic parts quickly. While the second sub-elements are being attached to the first sub-elements in the assembly position, the preforms situated on the opposite side surface of the center block can undergo a cooling phase.

The invention claimed is:

1. An injection-molding device (1) for producing plastic parts from at least one first and one second sub-element, comprising:
    first cavity halves (3) and, opposite these, second cavity halves which can be slid in a first direction (x), located at a starting position;
    a center block (6) arranged between the first and the second cavity halves rotatable about an axis (z) and slid in the first direction (x); and
    including center cavity halves (8) on at least one side surface (7), wherein, together with the center cavity halves (8), the first cavity halves (3) form first cavities for receiving a first plastic component for a preform (12) in a first closing position,
    third cavity halves (17) arranged on the center block (6), which, together with fourth cavity halves (13) arranged next to the first and/or second cavity halves, form additional cavities for second sub-elements (16), and
    a working device (9) arranged to the side of the center block (6), wherein
    in a second closing position 180° from the starting position, together with the preforms (12) in the center cavity halves, the second cavity halves at least partially form second cavities for receiving a second plastic component and for molding first sub-elements (15), and
    the second sub-elements (16) and the first sub-elements (15) fitted to one another in an assembly position 270° from the starting position of the center block (6) by the working device (9), wherein the assembly position follows the first and the second closing position in the direction of rotation of the center block.

2. The injection-molding device as claimed in claim 1, wherein the first closing position forms a first parting plane and the second closing position forms a second parting plane in which the center and third cavity halves (8, 17) are rotated by 180°.

3. The injection-molding device as claimed in claim 1, wherein, the first and fourth cavity halves (3, 13) and the second and fourth cavity halves are arranged alternately with respect to one another at regular intervals on a first mold arranged on the center block (6) plate (2) and on a second mold arranged on the center block (6) plate (4), respectively, which slides with respect thereto in a first direction, respectively.

4. The injection-molding device as claimed in claim 1, wherein the center and third cavity halves (8, 17) have a shaped fit to hold sub-elements (15; 16).

5. The injection-molding device as claimed in claim 1, wherein the working device (9) traverses relative to the center block (6) in the direction of the third or center cavity halves and/or in the direction of the first or second cavity halves.

6. The injection-molding device as claimed in claim 1, wherein the working device (9) includes outside tie bars (5), by which the mold mounting plates (2, 4) can be moved.

7. The injection-molding device as claimed in claim 1, wherein the working device (9) includes a gripper unit with a multiplicity of gripper elements (11), provided on a working surface (10) and arranged corresponding to an arrangement of the center and third cavity halves.

8. The injection-molding device as claimed in claim 1, wherein the cavity halves form cavities for producing at least partially hollow plastic parts or sub-elements.

\* \* \* \* \*